United States Patent [19]
Clementz et al.

[11] Patent Number: 5,303,758
[45] Date of Patent: Apr. 19, 1994

[54] TIRE SIDEWALL DESIGN PATTERNS

[75] Inventors: Michel Clementz, Arlon, Belgium; Gilbert Feller, Burden; Raymond Merz, Junglinster, both of Luxembourg

[73] Assignee: The Goodyear Tire & Rubber Company, Akron, Ohio

[21] Appl. No.: 898,595

[22] Filed: Jun. 15, 1992

[51] Int. Cl.$^5$ .............................................. B60C 13/02
[52] U.S. Cl. .................................. 152/523; D12/152; 428/167; 428/913.3; 428/542.6
[58] Field of Search ....... 152/523, 524, 525, DIG. 12; 156/75, 116, 196, 219; 425/385, 436 R; 428/60, 163, 167, 179, 908, 913.3, 542.2, 542.6; D12/152

[56] References Cited
U.S. PATENT DOCUMENTS

| | | |
|---|---|---|
| D. 171,451 | 2/1952 | Kraft . |
| D. 204,585 | 4/1966 | Vizina, Jr. ..................... D12/152 |
| 1,448,286 | 3/1923 | Comstock ..................... 156/116 |
| 1,635,077 | 12/1924 | Erskine . |
| 2,082,928 | 6/1937 | Wilhelmy . |
| 2,109,000 | 2/1938 | Waldo . |
| 2,807,564 | 9/1957 | Mitchell . |
| 4,198,774 | 4/1980 | Roberts et al. . |
| 4,625,101 | 11/1986 | Hinks et al. .................. 152/523 |
| 4,900,378 | 2/1990 | Wistehuff ..................... 428/542.6 |

FOREIGN PATENT DOCUMENTS

| | | |
|---|---|---|
| 4111345A | 11/1991 | Fed. Rep. of Germany . |
| 138775 | 2/1920 | United Kingdom . |
| 330432 | 7/1930 | United Kingdom . |
| 2010755 | 7/1979 | United Kingdom . |

Primary Examiner—Michael W. Ball
Assistant Examiner—Nancy T. Krawczyk
Attorney, Agent, or Firm—David L. King

[57] ABSTRACT

A sidewall 12 of a tire 10 having a surface with distinctive design patterns is described. Pattern A has a plurality of ridges 20 of similar cross-sectional shapes, each ridge 20 being substantially parallel to an adjacent ridge 20. Pattern B is superimposed over a portion of the design pattern A. Pattern B has a plurality of parallel ridges 30 extending in an angular direction between 45° and 90° relative to the ridges 20 of pattern A. In one embodiment a pattern C is included, pattern C having at least two parallel ridges 40 angularly oriented in the range of 45° to 90° relative to the ridges 20 of pattern A. The ridges 20 of pattern A intersect two ridges 40 of pattern C. The design patterns may form a circumferentially continuous wide decorative band with striped alpha-numeric markings superimposed over a portion of the wide decorative band.

11 Claims, 8 Drawing Sheets

TIRE SIDEWALL DESIGN PATTERNS

BACKGROUND

This invention generally pertains to design patterns for opaque articles. More specifically, this invention relates to at least two design patterns used on the surface of a opaque article, the patterns each comprising pluralities of parallel ridges oriented to yield a striking visual appearance.

The invention is particularly applicable to the black sidewalls of rubber tires. However, it will be appreciated by those skilled in the art that the invention has broader applications and may be employed in the manufacture of rubber mats or various other opaque articles.

Manufacturers have for many years placed numerals, letters, characters or other designations upon the sidewalls of tires to enhance the appearance and marketability of their products. Such markings are described in U.S. Pat. Nos. 4,198,744 and 4,823,856.

The subject matter of U.S. Pat. No. 4,198,774, issued Apr. 22, 1980, was invented by Roberts and Lowther. The invention describes the use of lineal projections which are substantially straight, parallel, and of substantially identical cross-section to form indicium. An indicium is described as a letter or numeral or the like.

The latter issued patent of Mr Charles W Roberts, U.S. Pat. No. 4,823,856, issued Apr. 25, 1989, describes the use of serrated outline markings for the sidewall of a tire. The invention relates to a design of a substantially flat ungrooved portion surrounded by a serrated portion which includes a plurality of ribs separated by grooves. The combination of the flat design surrounded by a serrated portion defines an indicium.

The present invention employs the use of at least two distinctive design patterns which improves the visual appearance of an opaque article by increasing the visual contrast of the surfaces of articles. The invention is particularly well-suited for the sidewall of a tire, particularly a black sidewall tire. The combination of design patterns in at least one embodiment of the invention, has the effect of making the sidewall markings boldly stand out when viewed from an angular perspective of 60° or less relative to a plane parallel to the sidewall wall of the tire. The design patterns uniquely change in contrast relative to each other in an inverse relationship as a function of the position of the tire.

SUMMARY OF THE INVENTION

This invention relates to an opaque article having a surface with at least two distinctive design patterns, A and B. Pattern A has a plurality of ridges of similar cross-sectional shapes, each ridge being substantially parallel to an adjacent ridge. Pattern B is superimposed over a portion of the design pattern A. Pattern B has a plurality of parallel ridges extending in an angular direction between 45° and 90° to the ridges of pattern A.

In one embodiment, the article includes a third design pattern C. Pattern C has at least two parallel ridges angularly oriented in the range of 45° to 90° relative to the ridges of pattern A and wherein the ridges of pattern A intersect two ridges of pattern C.

In a preferred embodiment the opaque article is an elastomer containing a pigmented filler. The pigmented filler is carbon black. The article is a tire sidewall wherein pattern A has substantially radially extending ridges forming a circumferentially continuous wide decorative band on the surface of the tire sidewall. Pattern B is superimposed over a portion of pattern A. Pattern B has a plurality of parallel ridges forming alpha-numeric markings within the wide decorative band.

DEFINITIONS

"Axial" and "axially" are used herein to refer to lines or directions that are parallel to the axis of rotation of a tire.

"Circumferential" as used herein means lines forming or enclosing an arc, the arc being within a plane perpendicular to the axis of rotation of the tire.

"Light deflection" means that as light strikes a surface, the reflected light is angularly directed relative to the angle of incidence of the light source yielding what appears to be a light absorbing characteristic to an observer who is position in general alignment with the light source.

"Light reflection" means that as light strikes an object, the reflected light is generally aligned with the angle of incidence yielding what appears to be a shiny or reflective characteristic to an observer who is positioned in general alignment with the light source.

"Radial" and "radially" are used to mean directions radially toward or away from the axis of rotation of the tire.

"Sidewall" means that portion of a tire between the tread and the bead.

"Tread" means that portion of the tire that comes into contact with the road under normal inflation and load.

DETAILED DESCRIPTION OF THE INVENTION

Figure 1:
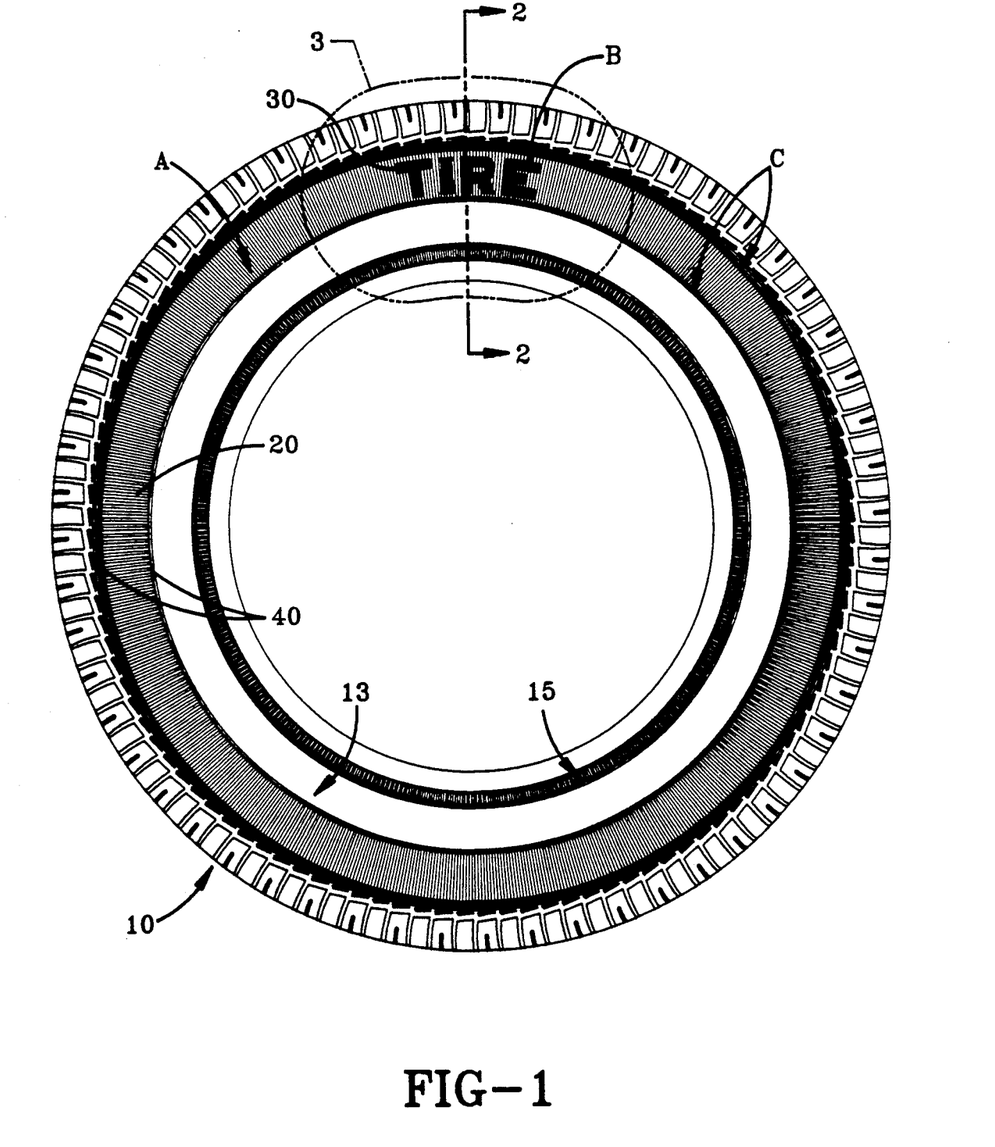
FIG. 1 illustrates a side view of a tire with a pattern A, pattern B and pattern C shown on the sidewall of the tire.

An opaque article made according to the invention is shown in FIG. 1 . A side view of a tire 10 with design patterns A, B and C on the sidewall 12 of the tire 10 is illustrated in FIG. 1.

In the preferred embodiment shown in exemplary FIG. 1, pattern A forms a wide decorative band comprised of ridges 20. The ridges 20 of pattern A each extend in a substantially radial direction. In the illustrated preferred embodiment, ridges 20 of pattern A extend equally in length and have similar cross-sectional shapes. Each radially extending ridge 20 appears to be parallel to an adjacent ridge 20.

Design pattern B is illustrated in FIG. 1 superimposed over a portion of the design pattern A. Pattern B has a plurality of parallel ridges 30 extending perpendicularly relative to the ridges 20 of the superimposed portion of pattern A.

As illustrated in FIG. 1, the plurality of ridges 30 of pattern B are oriented so as to form the word TIRES, the word TIRES overlaying or being superimposed over some of the ridges 20 of pattern A. Pattern A forms a background for the pattern B markings.

As further illustrated in FIG. 1, pattern C has a plurality of parallel ridges 40 perpendicularly oriented relative to the ridges 20 of pattern A and wherein the ridges 20 of pattern A intersect two ridges 40 of pattern C. In the preferred embodiment illustrated in FIG. 1, pattern C consists of one or more adjacent circumferentially-continuous ridges 40 radially outward of the ridges 20 of pattern A and one or more circumferentially-continuous annular ridge 40 radially inward of the ridges 20 of pattern A.

Figure 2:
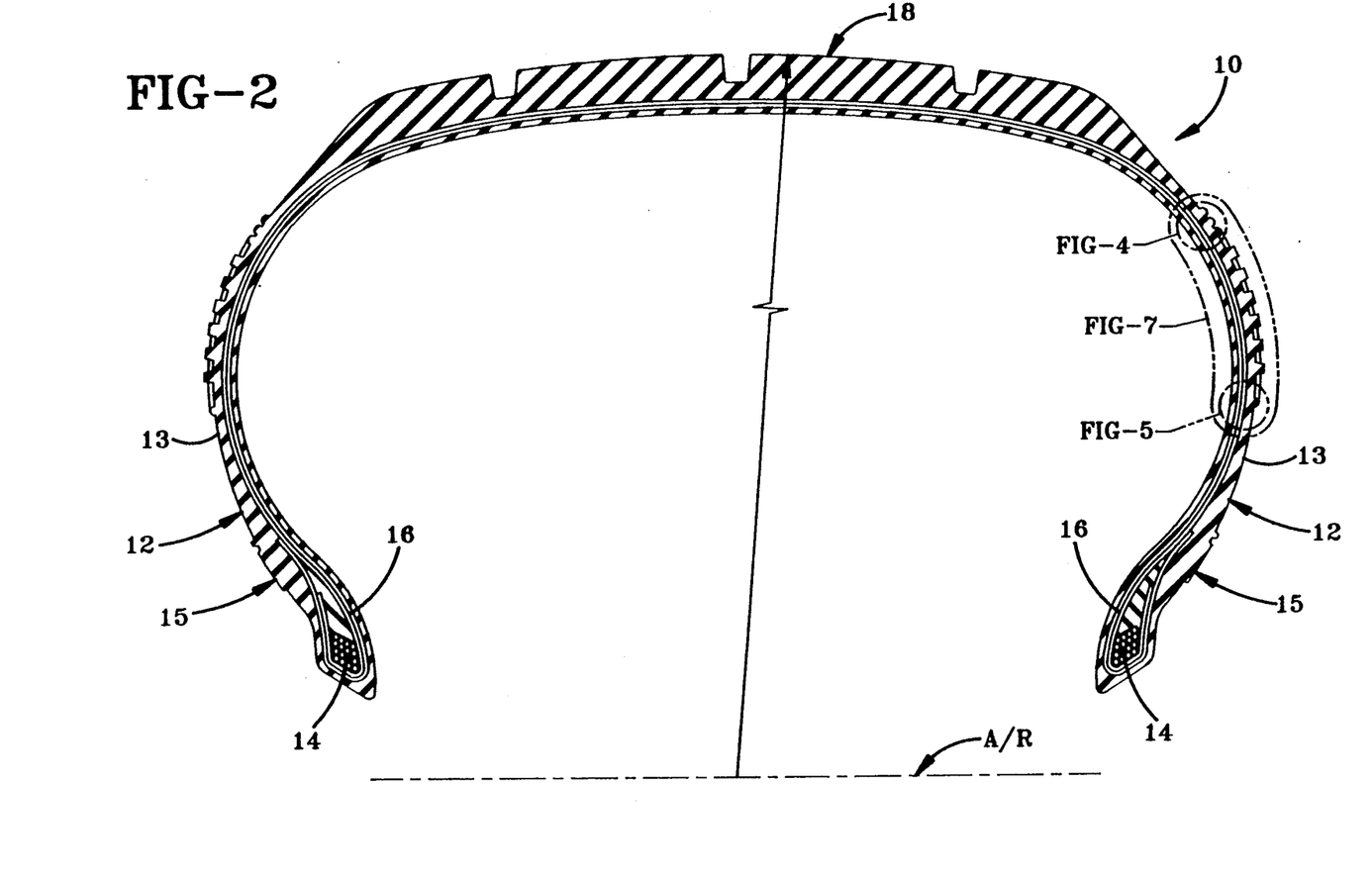
FIG. 2 is a cross sectional view of the tire of FIG. 1

FIG. 2 illustrates a cross sectional view of the tire 10 of FIG. 1 taken along lines 2—2. The tire 10 has an axis of rotation (A/R), a pair of annular beads 14, carcass plies 16 wrapped around the annular beads 14, a tread 18 disposed over the carcass plies 16 in a crown area of the tire and sidewalls 12 disposed between the tread 18 and the beads 14. A sidewall 12 of the tire 10 has the design pattern A, B and C located on the exterior surface 13 of the sidewall. Near the bead region a secondary decorative band 15 is illustrated.

Figure 3:
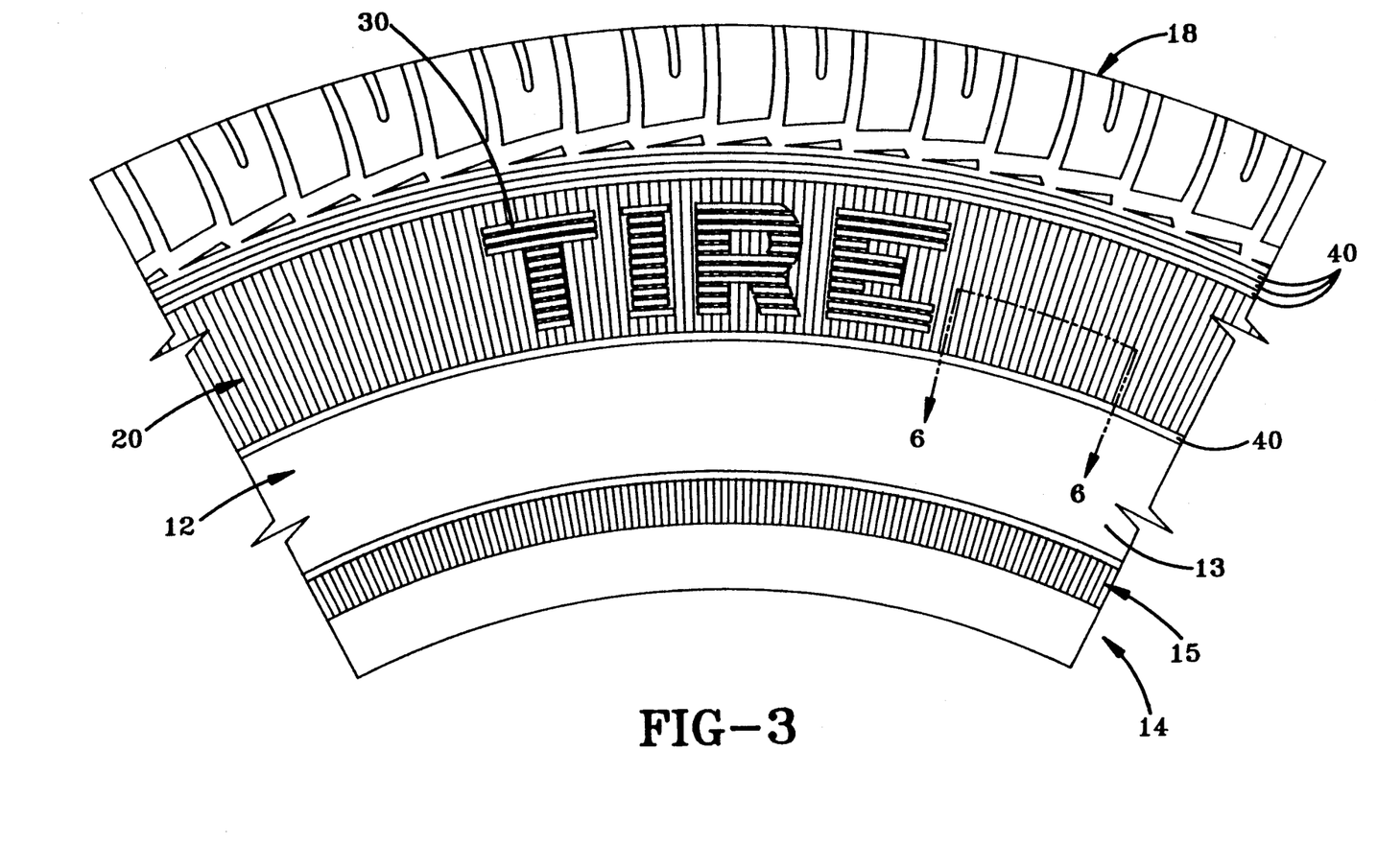
FIG. 3 is an enlarged view of the portion of pattern, A, B and C.

FIG. 3 is an enlarged view of a portion of design patterns A, B and C. The ridges 20 of pattern A are preferably of trapezoidal shape which approximate a triangular cross section. The bases of the trapezoidal cross sections are ideally positioned very close or intersect such that pattern A exhibits minimal surfaces parallel to the tire sidewall 12. The use of these trapezoidal cross sections yield a generally light deflecting or non-reflective background when viewed from a perpendicular position relative to the sidewall 12.

The design pattern B as illustrated at FIG. 3 is comprised of a plurality of ridges 30 having a trapezoidal shape approximating flat rectangular or square cross sectional shapes. The ridges are spaced a sufficient distance to provide a light shadowing space 33 between a flat light reflecting surface 34. The flat surfaces 34 yield a pattern exhibiting a light contrasting appearance whereby the observer can readily distinguish the design patterns of B which stand out when compared to the background patterns A and C.

Figure 4:
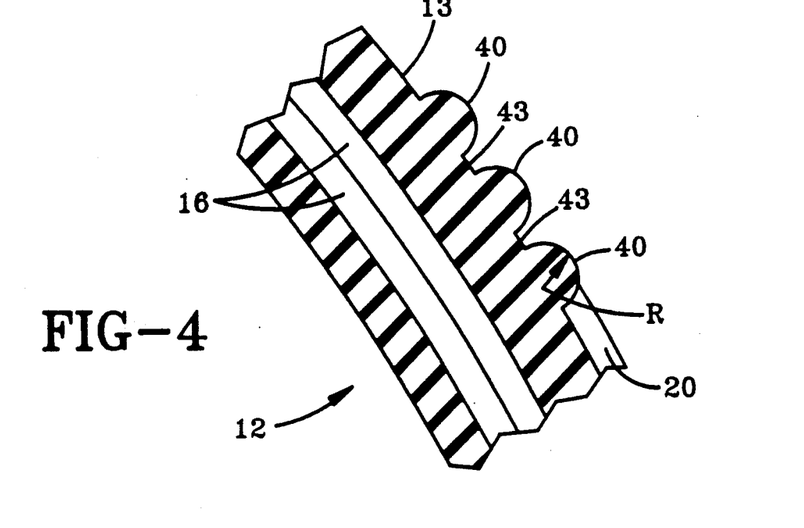
FIG. 4 is an enlarged view of a radially outer portion of pattern C taken from FIG. 2.

FIG. 4 illustrates an enlarged view of an upper portion of pattern C taken from FIG. 2. The annular circumferential ridges 40 of design pattern C have a cross section different from pattern A. In a preferred embodiment as illustrated, the cross sectional shape of the ridges is circular. The circular shapes, although generally light deflecting, are ideally spaced to yield a small flat light shadowing surface 43 between adjacent upper ridges 40. The upper ridges 40 of pattern C distinguishes the sidewall patterns A and B from the tread in the shoulder region. At the lower region a single ridge 40 of pattern C is shown of circular cross section. The circular cross sections are formed with a full radius (R). The cross section extends a distance h from the surface of the sidewall; in the preferred embodiment, the height "h" is 0.6 mm and the radius R of the cross section is 0.6 mm. Adjacent ridges 40 are spaced a distance of 0.2 mm. The upper and lower patterns may include one or more such ridges 40. The illustrated embodiment shows an upper pattern with three ridges 40 and a lower portion with only one ridge 40.

Figure 5:
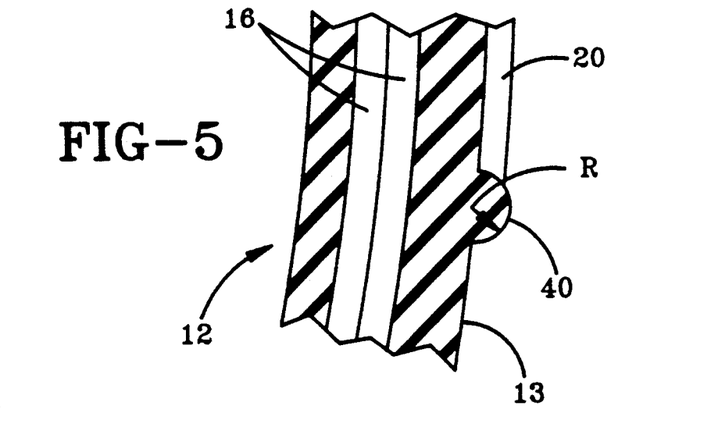
FIG. 5 is an enlarged view of a radially inner portion of pattern C taken from FIG. 2.

FIG. 5 is an enlarged view of a lower portion of pattern C taken from FIG. 2. The lower ridge 40 of pattern C has an identical cross section to those of the upper pattern in the preferred embodiment as illustrated. The shape and size of the ridges 40 of design pattern C alternatively could be dissimilar. One of the primary functions of design pattern C is to provide a border or boundary for the overall sidewall design formed by the combination of patterns A, B and C. The pattern C also provides a means to improve venting of gases in the region of the sidewall during the molding of the tire.

Figure 6:
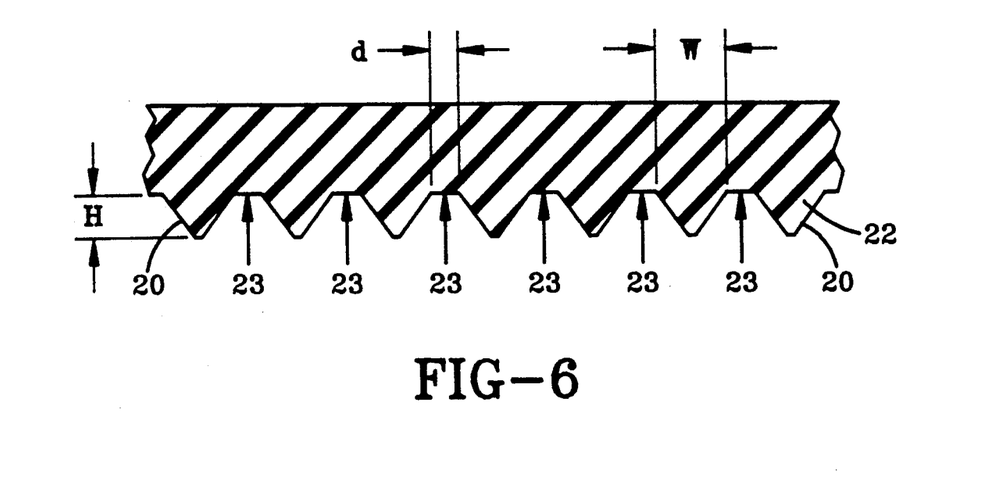
FIG. 6 is an enlarged cross sectional view of pattern A taken from FIG. 3.

FIG. 6 is an enlarged cross sectional view of pattern A taken from FIG. 3. The view illustrates the trapazoidal ridges 20 of generally triangular cross sectional shape. To facilitate molding and mold construction, the adjacent bases 22 may be spaced a distance (d) of less than ⅓ the height (h) of the ridge 20 and the space (d) should be less than 50% the width (w) of the base 22. This insures that the flat surface 23 formed by the spacing of the ridges 20 is minimized. The spaced distance (d) is effectively shadowed by the adjacent ridges 20 insuring a light deflecting or nonreflective background. The ridges 20 extend to a height of 0.45 mm from the sidewall and have a base 22 of 0.9 mm in width. In the preferred embodiment, each base 22 of ridge 20 is spaced a distance (d) of less than one half the width of the base. In the preferred embodiment the distance (d) was set at 0.3 mm. The very tip of the triangular shaped ridge 20 may be truncated in order to facilitate mold construction.

Figure 7:
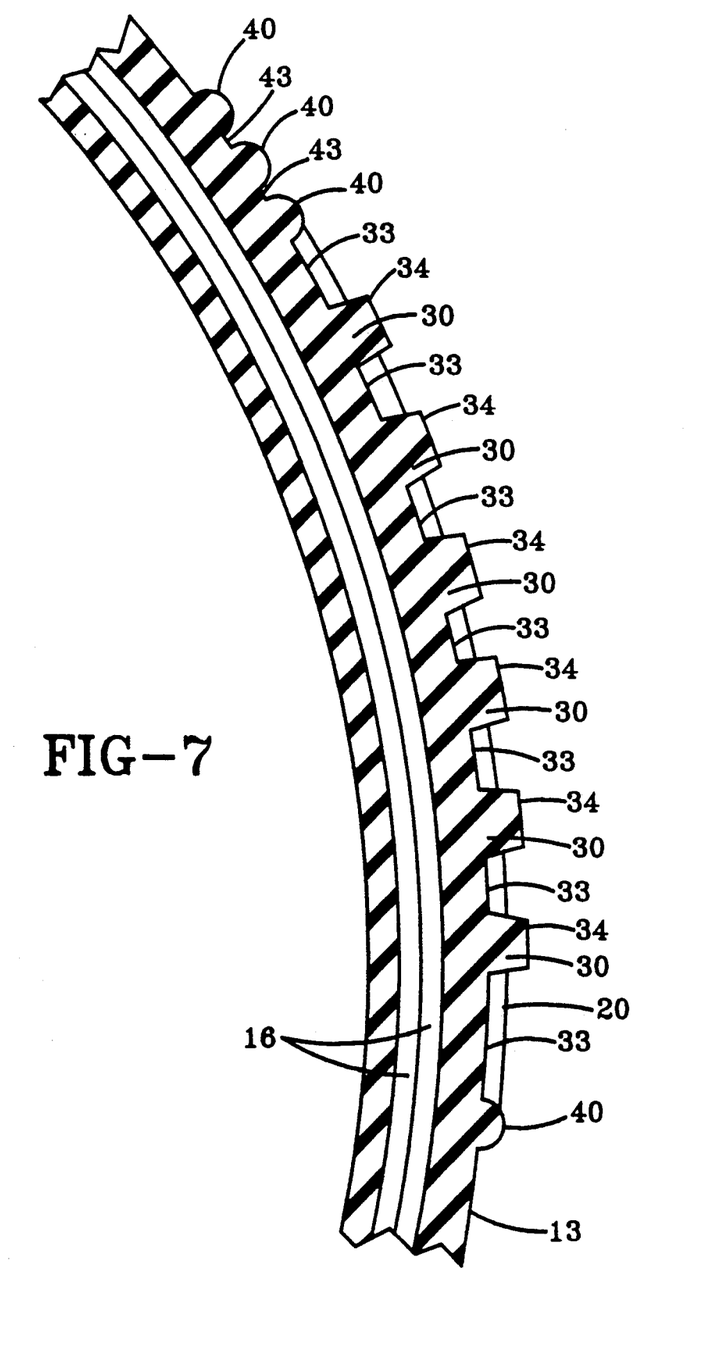
FIG. 7 is an enlarged cross sectional view of pattern B taken from FIG. 3.

FIG. 7 is an enlarged cross sectional view of pattern B taken from FIG. 3. The parallel ridges 30 of pattern B are superimposed over the generally triangular trapezoidal shaped ridges 20 of pattern A and spaced between two of the annular ridges 40 of pattern C. To enhance the visual appearance of the pattern B ridges 30, it is preferred that the ridges of pattern B extend outward from the surface of the sidewall a distance greater than the distance "h" of the ridges 20,40 of pattern A and pattern C. In the preferred embodiment, the ridges 30 of pattern B extend from the sidewall a distance of 1.1 mm. The ridges 20,40 of pattern A and pattern C extend from the sidewall 12 of the tire 10 distances of 0.45 mm and 06 mm respectively. It is not considered essential that the ridges 40 of pattern C extend a distance less than the ridges 30 of pattern B. Pattern B, however, should extend outwardly from the ridges 20 of pattern A in order to achieve the most striking visual appearance. The trapazoidal ridges 30 of pattern B are preferably of a substantially rectangular cross section. The ridges 30 extending outwardly from the sidewall and beyond the outermost extension of the ridges 20 of pattern A. Ideally, the ridges 30 have a generally flat outermost surface 32 which will reflect light. Alternatively the cross sections may consist of ridges having adjacent cross sections of dissimilar shape as illustrated in FIGS. 8A through 8E.

Figure 8A:
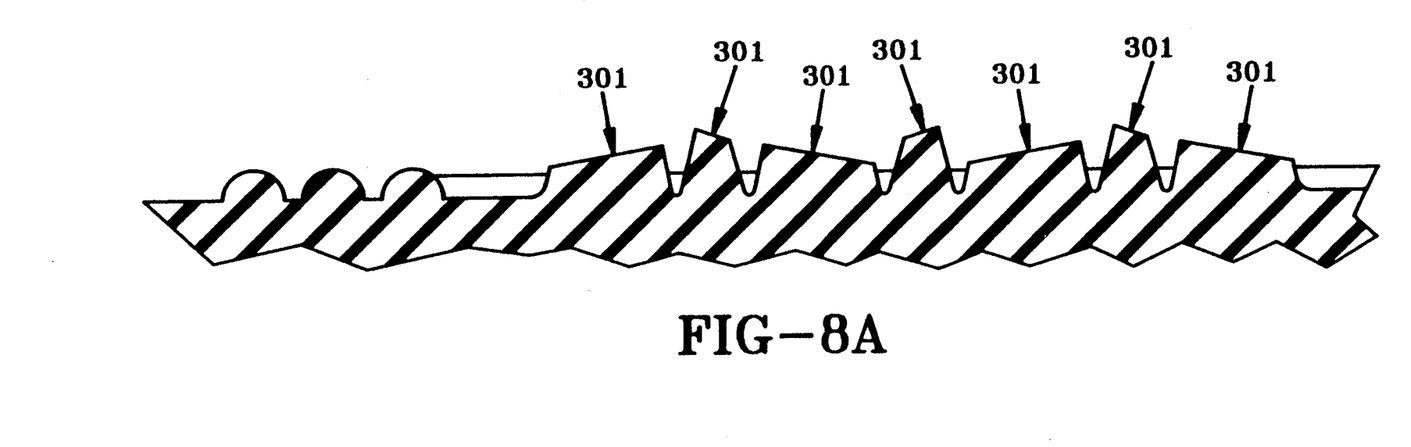
FIGS. 8A, 8B, 8C, 8D and 8E are alternative embodiments of pattern B illustrating the use of parallel ridges wherein the cross sectional shapes of adjacent ridges are dissimilar.
Figure 8B:
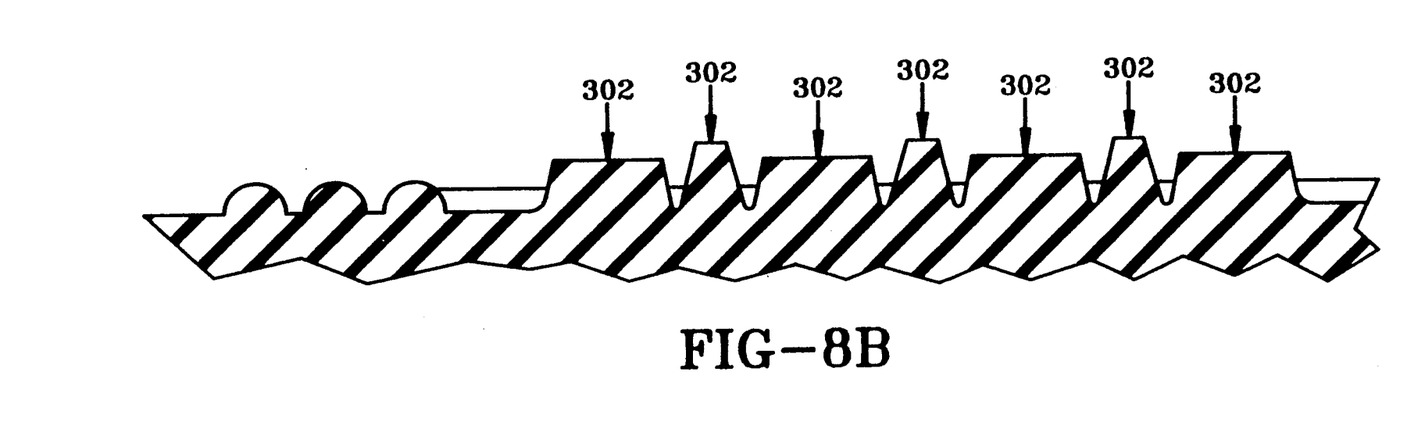
Figure 8C:
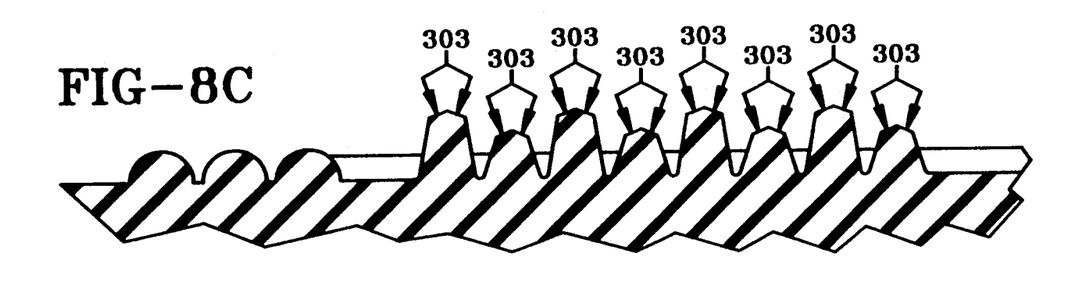
Figure 8D:
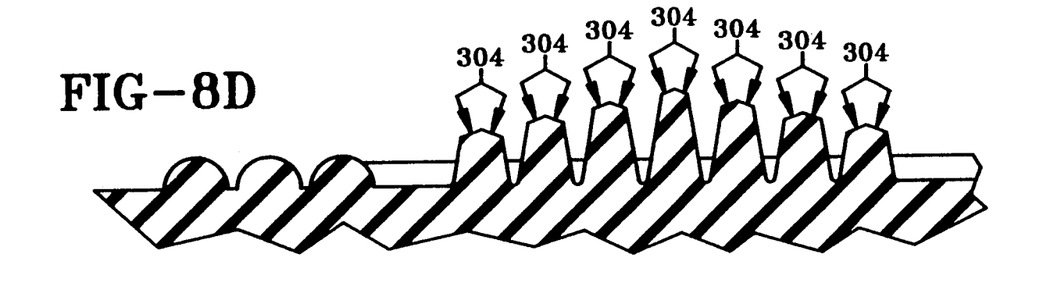
Figure 8E:
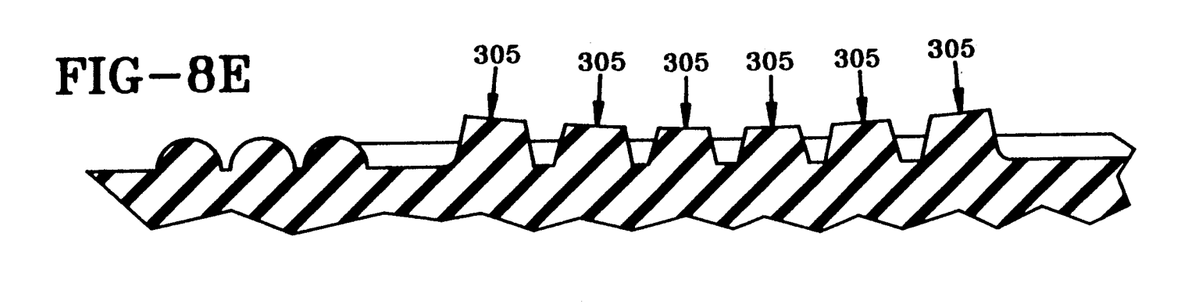

An alternating ridge height pattern is exhibited in FIGS. 8A through 8C. Pattern 8B employs flat surfaces 302 for light reflection. Patterns 8A, 8C and 8D each employ angularly oriented light reflecting surfaces (301,303 and 304 respectively). Patterns 8C and 8D utilize multiple angular oriented surfaces (303 and 304) for light reflection. FIG. 8D employs ridges 304 of increasing height toward the center of the pattern. FIG. 8E illustrates ridges having a light reflecting surfaces 305. The reflecting surfaces are profiled to align with a circumference of a circle, each surface 305 being of an arcuate shape defined by the radius of the circle traversing through an arc. Similarly the shape may be defined by an elliptical profile. In either case, the reflection of light is graduated or progressively changing as a function of position on the sidewall. These and any number of combinations of ridge shapes may be employed to accomplish a variety of contrasting appearances.

Figure 9:
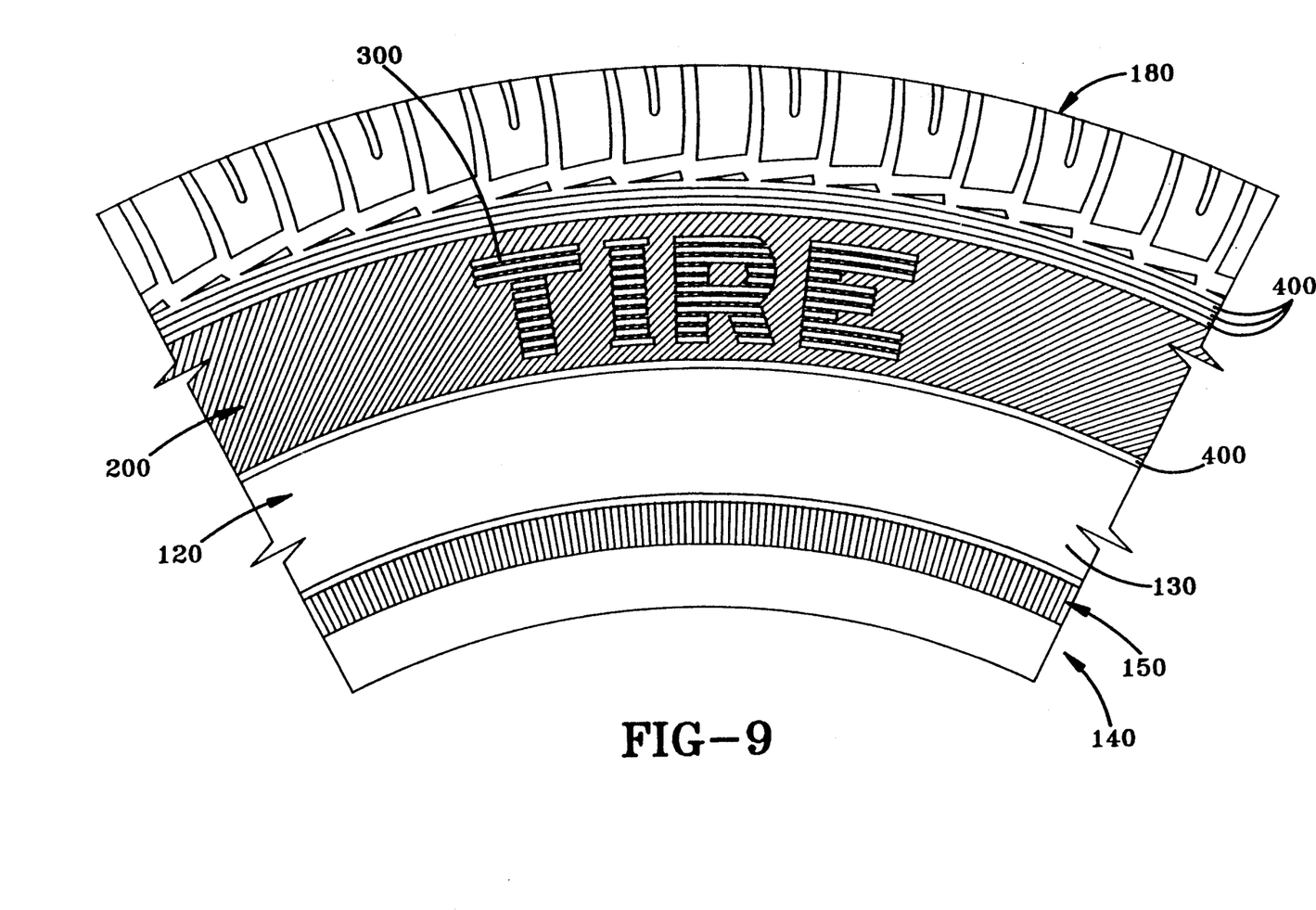
FIG. 9 is a view of a portion of a tire sidewall illustrating the embodiment with angularly oriented ridges of a background pattern.

FIG. 9 illustrates an embodiment of the invention wherein the background pattern has slanted ridges 200. A portion of a tire sidewall 120 is illustrated. The sidewall 120 has an exterior surface 150, a pair of annular beads 140, a tread 180, a secondary decorative band 150, and three design patterns forming a wide decorative band. The background design pattern is comprised of a plurality of slanted or angularly extending ridges 200. The ridges 200 as illustrated are oriented at a 45° angle relative to the radial direction. Each ridge is substantially oriented parallel to the adjacent ridge 200. A plurality of parallel ridges 300 are superimposed over a portion of the ridges 200. The ridges 300 extend generally circumferentially and are arranged in the exemplary FIG. 9 forming the word TIRE. A third pattern of ridges 400 is illustrated circumferentially bordering the background pattern. Each of the ridges 200 intersect two of the ridges 400.

The invention as described above has several distinct advantages in addition to improved appearance. The ridges 30 of pattern B are believed to be preferable to a solid indicium because the use of multiple ridges tend to mask or conceal slight molding imperfections. A solid indicium tend to highlight any small imperfection because the observer's attention is drawn to the imperfection.

A second benefit of the invention is that the intersections of the ridges 20 of pattern A with the annular ridges 30 of pattern B and the ridges 40 of pattern C provide improved venting of entrapped gases. The improved venting greatly minimizes the occurrence of surface blemishes that occur as a result of entrapped gases during the molding process.

The combination of reduced occurrence of surface blemishes and the masking of those that might occur greatly reduces the potential of producing a cosmetically unacceptable product.

The visual appearance of the tire 10 is believed to be an improvement over currently available products. The design pattern B yields a striped character having a dynamic visual impression. The wide decorative band formed by pattern A provides a background which enhances the characters formed by pattern B. The wide decorative band of pattern A has changing light reflection characteristics as a function of tire position and the observer's perspective view. The ridges 20 of pattern A tend to deflect light at the top and bottom of the tire but exhibit a shiny appearance to the left or right.

It has been observed that a tire made according to the present invention has characters of changing visual appearance as a function of the observer's position relative to the tire. In particular, when the observer looks at the tire sidewall from an angular perspective and when pattern B is oriented at either 90° or 270° relative to the top of the tire, the characters of pattern B appear dark against the shiny or highly light reflective pattern A yielding a high contrast with the background. When pattern B is at 0° or 180°, the pattern B appears light against the dark pattern A yielding an inverse contrast opposite to the light reflective appearance when pattern B is in the 90° or 270° position. This changing visual appearance adds to the unique aesthetic quality and appeal of this sidewall design.

The prior art tires of the past were designed to maximize contrast by using a combination of protruding flat letters or outlined lettering on a flat background, striped letters on a flat background, or flat letters on a striped background. The use of striped lettering in combination with a striped background as described above achieves a novel contrast changing appearance heretofore unachieved in tire sidewall marking.

In the preferred embodiment, the tire sidewall comprises an elastomer pigmented with carbon black. This sidewall is commonly called a blackwall tire. It is believed that the sidewall could be pigmented white, as in white sidewall tires, or any other color and still achieve the visual contrast effects as described above.

The application of these teachings, although highly adaptable to tire sidewalls, is not limited to such applications. The teachings are also applicable to rubber floor mats or any variety of opaque articles.

What is claimed is:

1. A tire sidewall having an annular surface, the surface having a design pattern, the design pattern consisting of:
  a) a first design pattern, a first pattern having a plurality of ridges of similar cross sectional shape, each ridge being substantially parallel to an adjacent ridge of the first pattern and inclined relative to the circumferential direction;
  b) a second design pattern superimposed over a portion of the first design pattern, second pattern having a plurality of spaced ridges, each ridge being substantially parallel to an adjacent ridge of the second pattern and extending outwardly from the first pattern and in an angular direction between 45° and 90° relative to the ridges of the first pattern, and
  wherein when the first pattern appears shiny or highly light reflective, the second pattern appears dark, and conversely when the second pattern appears shiny or highly light reflective, the first pattern appears dark, yielding an inverse contrast between the first and second pattern which changes as a function of the observer's position relative to the tire.

2. The tire sidewall of claim 1 wherein the ridges of the second design pattern includes at least two sets of parallel ridges of dissimilar cross section.

3. The tire sidewall of claim 1 wherein the ridges of the second pattern are of a similar cross section.

4. The tire sidewall of claim 1 wherein the ridges of the first pattern are equally spaced.

5. The tire sidewall of claim 1 wherein the ridges of the first pattern extend a distance "h", "h" being about 0.45 mm from the surface of the sidewall and the ridges of the second pattern extend a distance greater than "h".

6. The tire sidewall of claim 1 wherein the first design pattern has ridges radially extending.

7. The tire sidewall of claim 6 wherein the ridges of the first pattern are circumferentially continuously repeated about the sidewall forming a wide decorative band.

8. The tire sidewall of claim 7 wherein the plurality of ridges of the second pattern is positioned over a portion of the ridges of the first pattern forming alpha-numeric characters.

9. The tire sidewall of claim 1 wherein the ridges of the second pattern have a trapezoidal cross-section.

10. A tire sidewall having an annular surface, the surface having a design pattern, the design pattern consisting of:
   a) a first design pattern, the first pattern having a plurality of ridges of similar cross sectional shape, each ridge being substantially parallel to an adjacent ridge of the first pattern and inclined relative to the circumferential direction;
   b) a second design pattern superimposed over a portion of the first design pattern, second pattern having a plurality of spaced ridges, each ridge being substantially parallel to an adjacent ridge of the second pattern and extending outwardly from the first pattern and in an angular direction between 45° and 90° relative to the ridges of the first pattern; and
   c) a third design pattern, the third pattern having at least two circumferentially extending parallel ridges angularly oriented in the range of 45° to 90° relative to the ridges of the first design pattern and wherein the ridges of the first pattern are located between the intersect a radially inner ridge of the third pattern and a radially outer ridge of the third pattern; and, wherein when the first pattern appears shiny or highly light reflective, the second pattern appears dark, and conversely when the second pattern appears shiny or highly light reflective, the first pattern appears dark, yielding an inverse contrast between the first and second pattern which changes as a function of the observer's position relative to the tire.

11. The tire sidewall of claim 10 wherein the ridges of the second design pattern includes at least two sets of parallel ridges of dissimilar cross section.

* * * * *

UNITED STATES PATENT AND TRADEMARK OFFICE
CERTIFICATE OF CORRECTION

PATENT NO. : 5,303,758
DATED : Apr. 19, 1994
INVENTOR(S) : Clementz et al.

It is certified that error appears in the above-identified patent and that said Letters Patent is hereby corrected as shown below:

TITLE PAGE, ITEM [75]
Inventors: Raymond Merz should be Raymond Merx.

Signed and Sealed this

Fourth Day of October, 1994

BRUCE LEHMAN

Attest:

Attesting Officer

Commissioner of Patents and Trademarks